United States Patent
Glass

(10) Patent No.: US 10,550,236 B1
(45) Date of Patent: Feb. 4, 2020

(54) LASER-CUTTABLE POLYOLEFIN SHRINK WRAP

(71) Applicant: Apple Inc., Cupertino, CA (US)

(72) Inventor: John W. Glass, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 148 days.

(21) Appl. No.: 15/797,262

(22) Filed: Oct. 30, 2017

Related U.S. Application Data

(60) Provisional application No. 62/515,440, filed on Jun. 5, 2017.

(51) Int. Cl.
| | | |
|---|---|---|
| B65D 75/00 | (2006.01) |
| C08J 5/18 | (2006.01) |
| B65B 61/06 | (2006.01) |
| C08K 5/00 | (2006.01) |
| C08J 7/04 | (2020.01) |
| B65B 53/00 | (2006.01) |
| C08K 3/013 | (2018.01) |

(52) U.S. Cl.
CPC ............. *C08J 5/18* (2013.01); *B65B 53/00* (2013.01); *B65B 61/06* (2013.01); *B65D 75/002* (2013.01); *C08J 7/04* (2013.01); *C08K 3/013* (2018.01); *C08K 5/0008* (2013.01); *C08J 2323/02* (2013.01)

(58) Field of Classification Search
USPC ............. 206/497, 524.1, 524.3, 524.4, 524.6
See application file for complete search history.

(56) References Cited

U.S. PATENT DOCUMENTS

| | | | |
|---|---|---|---|
| 6,820,745 B1* | 11/2004 | Ono ....................... B65D 85/20 | 206/497 |
| 2005/0061701 A1* | 3/2005 | Osgood ................... B65B 61/18 | 206/455 |
| 2006/0096882 A1* | 5/2006 | Kam ..................... B65D 75/004 | 206/497 |
| 2014/0053509 A1* | 2/2014 | Henderson ................ B32B 7/12 | 53/442 |
| 2015/0225154 A1* | 8/2015 | Schloesser ............. B65D 71/08 | 206/497 |

* cited by examiner

*Primary Examiner* — Jacob K Ackun
(74) *Attorney, Agent, or Firm* — Sterne, Kessler, Goldstein & Fox P.L.L.C.

(57) ABSTRACT

Polyolefin shrink-wrap films may include a light-absorption additive to make them laser-cuttable by commonly-available lasers. This can make them more amenable to alteration by laser after being shrink-wrapped around a product package, such as alteration to remove sections of the polyolefin shrink-wrap film or to create tabs or perforations to facilitate removal of the polyolefin shrink-wrap film.

18 Claims, 8 Drawing Sheets

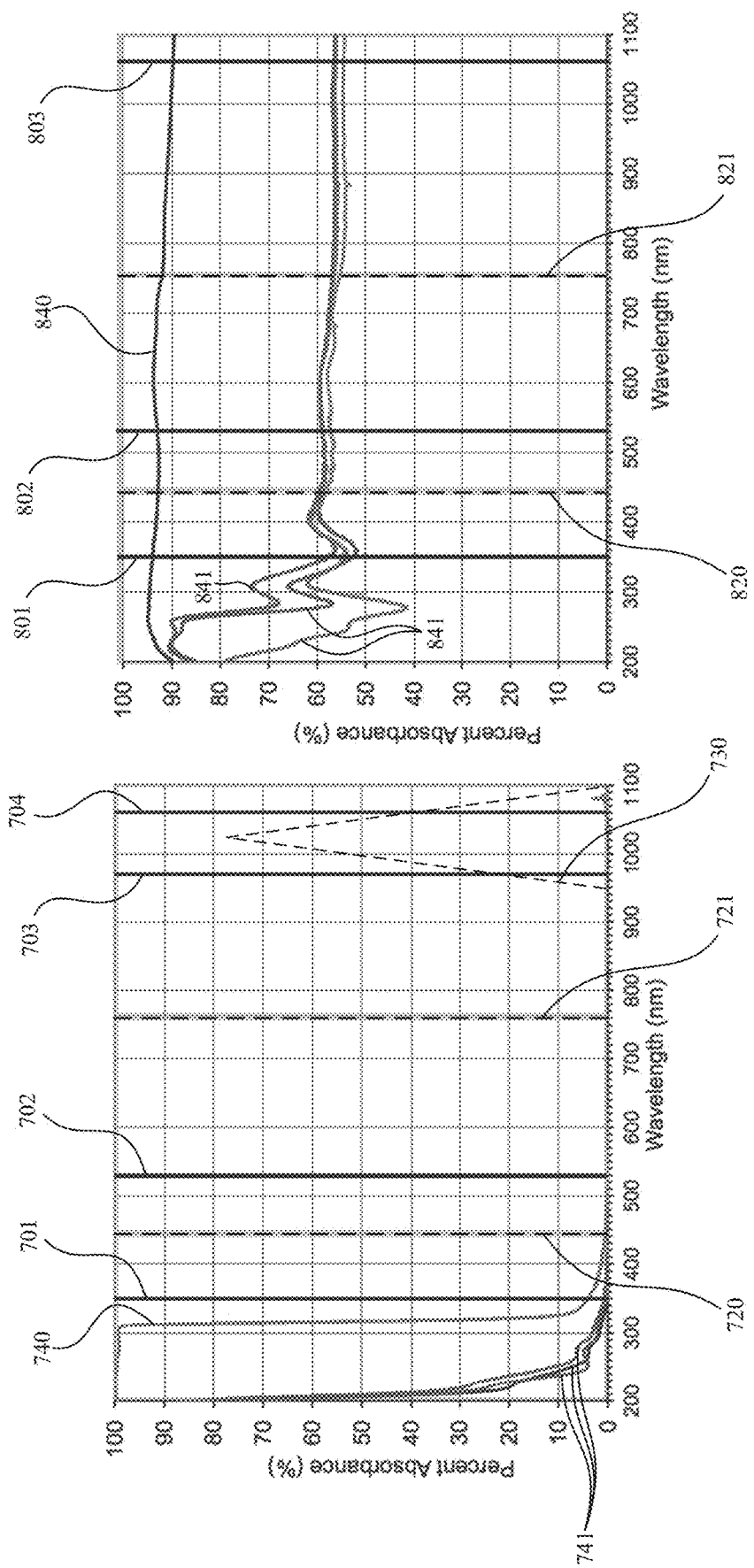

LASER-CUTTABLE POLYOLEFIN SHRINK WRAP

CROSS-REFERENCE TO RELATED APPLICATIONS

This application claims benefit under 35 U.S.C. § 119(e) of U.S. Provisional Patent Application No. 62/515,440, filed Jun. 5, 2017, which is incorporated herein in its entirety by reference thereto.

FIELD

The described embodiments relate generally to shrink-wrap films used for packaged products. More particularly, the present embodiments relate to shrink-wrap films comprising a polyolefin.

BACKGROUND

Many consumer products, including their packaging, are wrapped in a thin film that can protect the product from damage during shipping and discourage tampering with the product before it is sold.

SUMMARY

Various embodiments are disclosed that relate to polyolefin shrink wraps and methods of shrink wrapping products with a laser-cuttable polyolefin film. Polyolefin film typically is not readily cuttable by laser.

Shrink-wrapped packaged products as described herein may be packaged in a box made from cellulose-based materials. The box may be shrink wrapped using a shrink-wrap film formed of polyolefin and an additive. The additive may cause the shrink-wrap film to absorb laser light to an extent sufficient to cut the shrink-wrap film without visibly affecting the box. The additive may be a coating applied to a layer of polyolefin, or it may be mixed into the polyolefin. The shrink-wrap film may have laser-cut edges forming openings or perforations in the polyolefin film.

Shrink-wrap films as described herein may include polyolefin and a light-absorption additive. The shrink-wrap film may absorb laser light in a wavelength range of 900 nm to 1200 nm. The shrink-wrap film may have laser-cut edges. The additive may be applied to the polyolefin as a coating, or it may be mixed into the polyolefin.

Packaged products as described herein may include a protective layer between a box packaging the product and a polyolefin shrink-wrap film shrink-wrapped around the box. The shrink-wrap film may be cut by a laser having a wavelength in a wavelength range of 9000 nm to 10,000 nm, and the protective layer may both promote cutting of the shrink-wrap film and minimize damage to the box from the laser, by the protective layer's absorption of light energy from the laser.

Methods of shrink wrapping a package as described herein include wrapping a box made from cellulose-based materials with a polyolefin shrink-wrap film and cutting the polyolefin shrink-wrap film with a laser to form laser-cut edges without visibly affecting the box.

BRIEF DESCRIPTION OF THE DRAWINGS

The disclosure will be readily understood by the following detailed description in conjunction with the accompanying drawings, wherein like reference numerals designate like structural elements, and in which:

FIG. 2 shows the UV-Vis absorbance spectrum of various films as a function of wavelength.

FIG. 3 shows the UV-Vis absorbance spectrum of various packaging materials as a function of wavelength.

DETAILED DESCRIPTION

Figure 1:
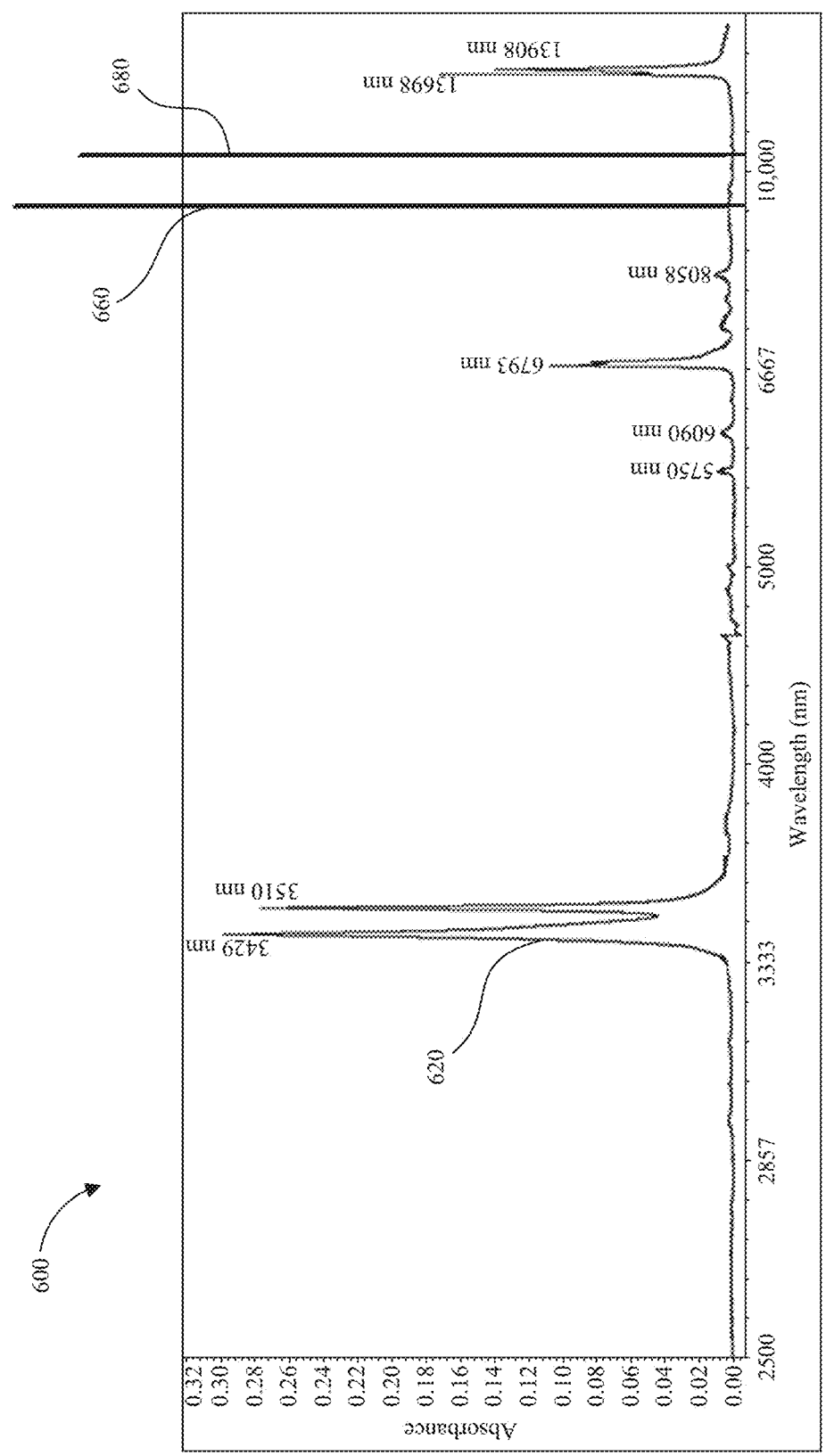
FIG. 1 shows the laser light absorbance of a polyolefin film at various wavelengths above 2500 nm.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Many consumer products, including their packaging, are wrapped in a thin shrink-wrap film that can protect the product from damage during shipping and prevent any tampering with the product before it is sold. The film may be clear to allow a customer to view the underlying packaging without visual impedance. A customer's first experience with a product is often removing this film. Existing methods for shrink wrapping an item use substances, for example PET (polyethylene terephthalate), that are crinkly and hard, which makes them noisy and difficult to open. Many of these films may require the use of a tool, such as scissors or a key, to remove the shrink wrap. Even if such films were perforated for easier removal, breaking the perforations would make a noisy, grating sound, which a customer opening the product may find off-putting.

To improve a customer's experience when removing a product's outer film, the film may be formed of POF (polyolefin). POF is less noisy than PET, and thus will not crinkle as much or make a noisy, grating sound when torn along a perforation. But POF film does not absorb laser light output by commonly-available lasers well enough to be perforated or trimmed using typical laser cutting processes without potentially damaging the product or packaging wrapped by the film.

To make POF shrink-wrap film cuttable (e.g., for perforating or trimming) using a commonly-available laser without damaging the product or package wrapped by the film, an additive may be incorporated in the film, or placed as a coating on the film. The additive may coat the entire film, or the additive may coat only areas to be targeted by the laser. The additive can give the film increased ability to absorb laser light, so that the film heats up where targeted by the laser enough to be cut by the laser. Alternatively, a protective layer may be positioned under the POF film to be laser-cut.

The protective layer may absorb laser light so that it heats up enough to cut through the POF film covering it, while protecting the packaging or product underneath it from laser damage. The protective film may be removed after the film is cut. In either case, the additive may not change the clarity of the film, so that it remains as visually clear as it would without the additive.

These and other embodiments are discussed below with reference to FIGS. 1-8B. However, those skilled in the art will readily appreciate that the detailed description given herein with respect to these Figures is for explanatory purposes only and should not be construed as limiting.

Polyolefin is a plastic polymer produced from the alkene monomer. Alkenes have a general formula of $C_nH_{2n}$. Examples of alkene monomers include ethylene, propylene, butenes, and pentenes, and copolymers thereof. Mixtures of polyolefins may be used. Polyolefins may be produced using various methods, including radical polymerization and catalytic polymerization. Polyolefins are commonly used as a thermoplastic. Examples of polyolefins include low density polyethylene (LDPE), high density polyethylene (HDPE), polypropylene, propylene copolymers, thermoplastic olefins, and ethylene copolymers, including ethylene vinyl acetate (EVA) and ethylene methyl acrylate (EMA).

Polyolefins are clear (i.e., transparent) when in the form of a film. Polyolefins have good chemical stability and are insoluble at temperatures under about 60° C. Polyolefins are insoluble in water. Polyolefin films are lightweight and strong. Polyolefin films are resistant to tearing and are flexible, even at low temperatures. Polyolefins generally have a Young's modulus of 8 MPa to 113 MPa and a tensile strength of about 4 MPa to about 100 MPa. and a yield strength of about 2000 psi to about 10,000 psi. Generally, a higher Young's modulus relates to a more stiff material that only slightly changes its shape under elastic loads. A lower Young's modulus relates to a more flexible material that changes it shape significantly under elastic loads.

In comparison to polyolefins, polyethylene terephthalate (PET) is commonly used as a film for shrink wrapping. PET includes polymerized units of the ethylene terephthalate monomer ($C_{10}H_8O_4$). PET has a Young's modulus in the range of 2000-3100 MPa, a tensile strength of 55 MPa to 75 MPa, and a yield strength of about 8,000 psi to about 20,000 psi.

Lasers may be used to cut material, such as shrink-wrap films. Common lasers have wavelengths less than 1600 nm, or over 8500 nm. For example, common solid-state lasers have wavelengths in the range of about 500 nm to about 1600 nm (e.g., in the range of 1000 nm to 1100 nm). A common solid-state laser usable for cutting shrink-wrap films is a 1064 nm laser.

As another example, common $CO_2$ lasers have wavelengths in the range of about 8800 nm to about 11,000 nm (e.g., in the range of 9200 nm to 9400 nm or 10,600 nm to 10,800 nm). Common $CO_2$ lasers usable for cutting shrink-wrap films are a 9300 nm laser and a 10,640 nm laser.

One challenge related to using POF shrink-wrap films for packaging is that the cut quality of a shrink-wrap film cut by a laser improves at a higher percent absorbance, for example a cut at 50% absorbance will be cleaner than a cut at 10% absorbance. However, POF does not absorb light at appreciable levels at the wavelengths of common lasers, and so cannot be laser cut industrially. This is shown in FIG. 1, which illustrates the absorbance of an exemplary POF film at various wavelengths. Chart 600 shows wavelengths, in units of nm, along the x-axis and absorbance percent along the y-axis. The wavelengths on the x-axis range from 2500 nm to 16,667 nm. Line 620 corresponds to the absorbance data across various wavelengths. Lines 660 and 680 show the wavelengths of common $CO_2$ lasers, at 9300 nm and 10,640 nm. As shown in FIG. 1, at both 9300 nm and 10,640 nm, the exemplary POF film absorbs about 0.75° % of light. Additionally, as shown in FIG. 1, POF film absorbs less than 0.75% of laser light across a large portion of the wavelength range shown, and it absorbs more than 0.75% of laser light only in wavelength ranges without a corresponding commonly-available laser (e.g., not at or near lines 660 and 680, which correspond to 9300 nm and 10,640 $CO_2$ lasers).

The lack of overlap between common laser wavelengths and wavelengths at which POF film absorbs laser light makes it difficult to cut, trim, or perforate the POF film using a laser. FIG. 2 shows the percent absorbance of various films as a function of wavelength. Line 740 shows the percent absorbance of an exemplary PET shrink film as a function of wavelength. The lines indicated by 741 show the absorbance of exemplary POF shrink films as a function of wavelength. Lines 701, 702, 703, and 704 represent wavelengths of common solid-state lasers. Lines 720 and 721 represent the wavelength boundary between the UV spectrum, visible spectrum, and near infrared spectrum. Wavelengths less than line 720 are in the UV spectrum. Wavelengths between line 720 and line 721 are in the visible spectrum, and wavelengths larger than line 721 are in the near infrared spectrum. FIG. 3 shows the percent absorbance of various boxes and other packaging containers used to package consumer goods as a function of wavelength. Lines 801, 802, and 803 represent wavelengths of commons solid-state lasers. Lines 820 and 821 represent the wavelength boundary between the UV spectrum, visible spectrum, and near infrared spectrum. Wavelengths less than line 820 are in the UV spectrum. Wavelengths between line 820 and line 821 are in the visible spectrum, and wavelengths larger than line 821 are in the near infrared spectrum. Line 840 shows the percent absorbance of a black packaging box as a function of wavelength. Lines 841 show the percent absorbance of various white packaging boxes as a function of wavelength.

Comparing FIG. 2 and FIG. 3, the POF films do not absorb a significant amount of light at wavelengths of common lasers, but the various boxes and packaging do absorb light at wavelengths of common lasers, such as in the range of 1000 nm to 1100 nm. POF films absorb a very low percentage of light at common laser wavelengths, which makes common lasers essentially ineffective at laser cutting POF films. If it is even possible to laser cut POF films with a commonly available laser, it can take a significant amount of time and energy to do so. Further, applying a laser for a significant amount of time to the POF film can heat the packaging to the point of burning or otherwise damaging the packaging.

Further, as shown in FIG. 3, white and black packaging absorbs more than 50% of light in the wavelength range of 400 nm to 1100 nm. Because of the higher absorbance rates of the box compared to the POF film, attempts to cut POF film while it is on the package may result in damage to the package. To increase the light-absorption properties of a POF film, and therefore increase the ability of it to be cut by a laser and the cut quality of a laser cut, in some embodiments a light-absorption additive is added to the polyolefin. The additive may itself absorb laser light and thereby absorb enough energy from a laser to cut the POF film of which it is a part. The additive may cause the POF film to absorb laser light to an extent sufficient to cut the POF film without visibly affecting packaging around which the POF film is shrink wrapped. In some embodiments, the light-absorption additive increases the light-absorption percentage of the shrink-wrap film by at least 100%, with respect to laser light of a 1064 nm solid-state laser, a 9300 nm CO2 laser, or a 10,640 nm CO2 laser. In some embodiments, the light-absorption additive increases the light-absorption percentage of the shrink-wrap film by at least 200%.

In some embodiments, for example for solid-state laser applications, the additive causes the POF film to absorb laser light in the wavelength range of 900 nm to 1100 nm, for example between 970 nm and 1070 nm (e.g., between 1020 nm and 1070 nm), within which range falls at least one commonly-available laser—a 1064 nm laser (see FIG. 2). In some embodiments, at one or more wavelengths in the range of 900 nm to 1100 nm, the additive causes the POF film to absorb at least 1%, at least 10%, at least 25%, at least 50%, at least 75%, or at least 90% of light. As shown in FIG. 2, broken line 730 represents the % absorbance of a POF shrink-wrap film that includes the light-absorption additive. Such increased % absorbance results in a POF film that is able to be cut cleanly (with a high cut quality and no visible jagged edges) at the wavelengths shown, which include the wavelength of at least one commonly-available laser (see line 703).

In some embodiments, for example for $CO_2$ laser applications, the additive causes the POF film to absorb laser light in the wavelength range of 8800 nm to about 11,000 nm, for example between 9200 nm and 9400 nm or between 10,600 nm to 10,800 nm (e.g., between 9290 nm and 9310 nm or between 10,630 nm to 10,650 nm). At least two commonly available lasers fall within those ranges—a 9300 nm laser and a 10,640 nm laser.

The additive can be used with the POF in various configurations to create the POF shrink-wrap film. For example, the additive may be coated on a layer of POF, or it may be compounded into a layer of POF. The additive may coat the entire POF film, to allow for laser cutting anywhere on the POF film. Alternatively, the additive may coat only portions of the POF film specifically targeted for laser cutting. In some embodiments the POF film is completely clear (i.e., it includes no visible defects or darkening of matter seen through the film), and the light-absorption additive does not visibly impair or otherwise affect the clarity of the POF film (e.g., the light-absorption additive may be clear). For example, the POF film may remain clear when the light-absorption additive is either coated on the layer of POF or compounded into the layer of POF. Additionally, even though the POF film remains both clear, the POF film is able to absorb sufficient light to be cut by common lasers, through the addition of the light-absorption additive.

In some embodiments, at any of the wavelengths disclosed above, the POF film containing the light-absorption additive has an absorbance of at least 0.75%. In some embodiments, the absorbance is at least 10%.

Figure 4:
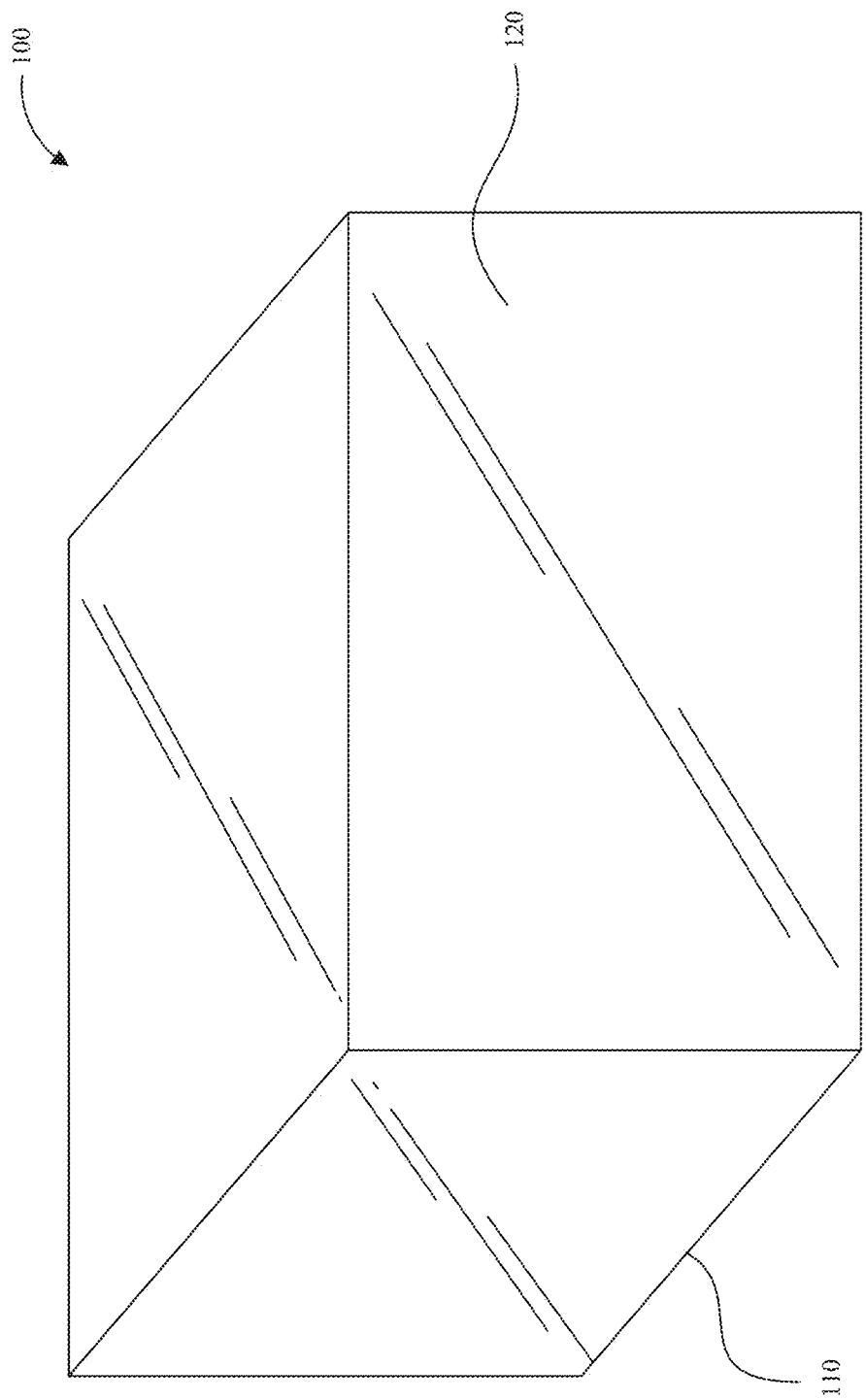
FIG. 4 shows an exemplary product package covered by a shrink-wrap film.
Figure 5:
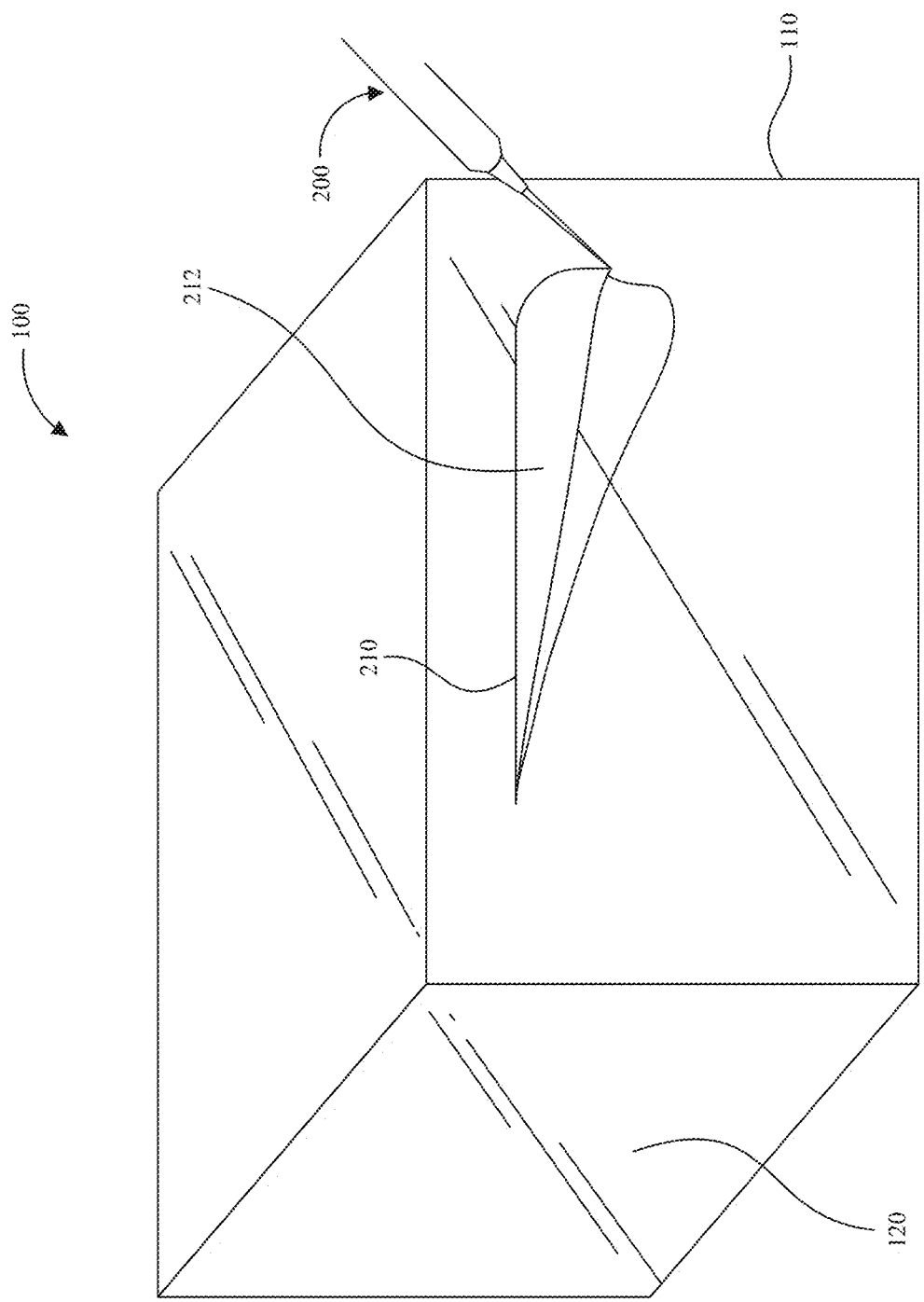
FIG. 5 shows a laser cutting the shrink-wrap film of the product package of FIG. 4.
Figure 6:
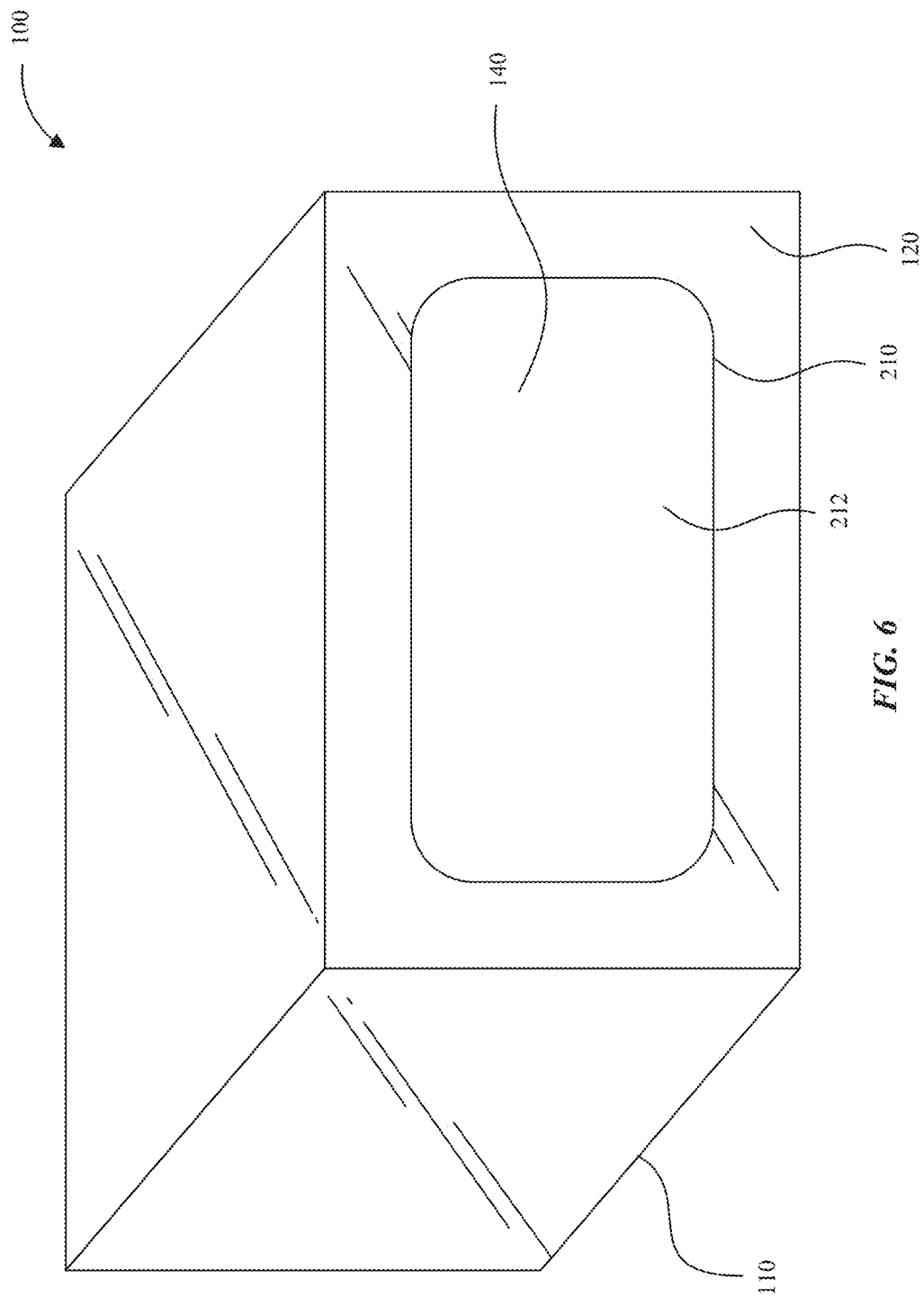
FIG. 6 shows the product package of FIG. 4 following laser cutting.

As shown in FIGS. 4-6, a product package 100 includes a box 110 covered in a POF shrink-wrap film 120. In some embodiments, POF shrink-wrap film 120 may have been applied to package 100 as described in U.S. patent application Ser. No. 14/465,585, filed Aug. 21, 2014, titled "Customizable Shrink Wrap," which is incorporated herein in its entirety by reference thereto.

FIG. 4 illustrates product package 100 after it has been shrink-wrapped with POF shrink-wrap film 120, but before any cutting operations have been performed. POF shrink-wrap film 120 may include a polyolefin or a polyolefin and a light-absorption additive, as described above.

In some embodiments, a laser is used to cut POF shrink-wrap film 120, as shown in FIG. 5. The laser may laser cut features into POF shrink-wrap film 120. Such features may include cutting segments of POF shrink-wrap film 120 to create an opening, trimming edges of the film, trimming excess film, and perforating the film.

In one example, as shown in FIG. 5, box 110 for product package 100 includes surfaces covered by POF shrink-wrap film 120, and a laser 200 is used to cut an opening 212 in POF shrink-wrap film 120 on the side of box 110. Laser 200 cuts into POF shrink-wrap film 120 along line 210, but does not damage box 110. FIG. 6 illustrates product package 100 following the laser cutting shown in FIG. 5. Following cutting, the area of shrink-wrap film 120 contained within the laser cutting line 210 may be removed, exposing surface 140 of box 110. In some embodiments, surface 140 is exposed on only one surface of box 110. In some embodiments, surface 140 is exposed on multiple surfaces of box 110.

Figure 7:
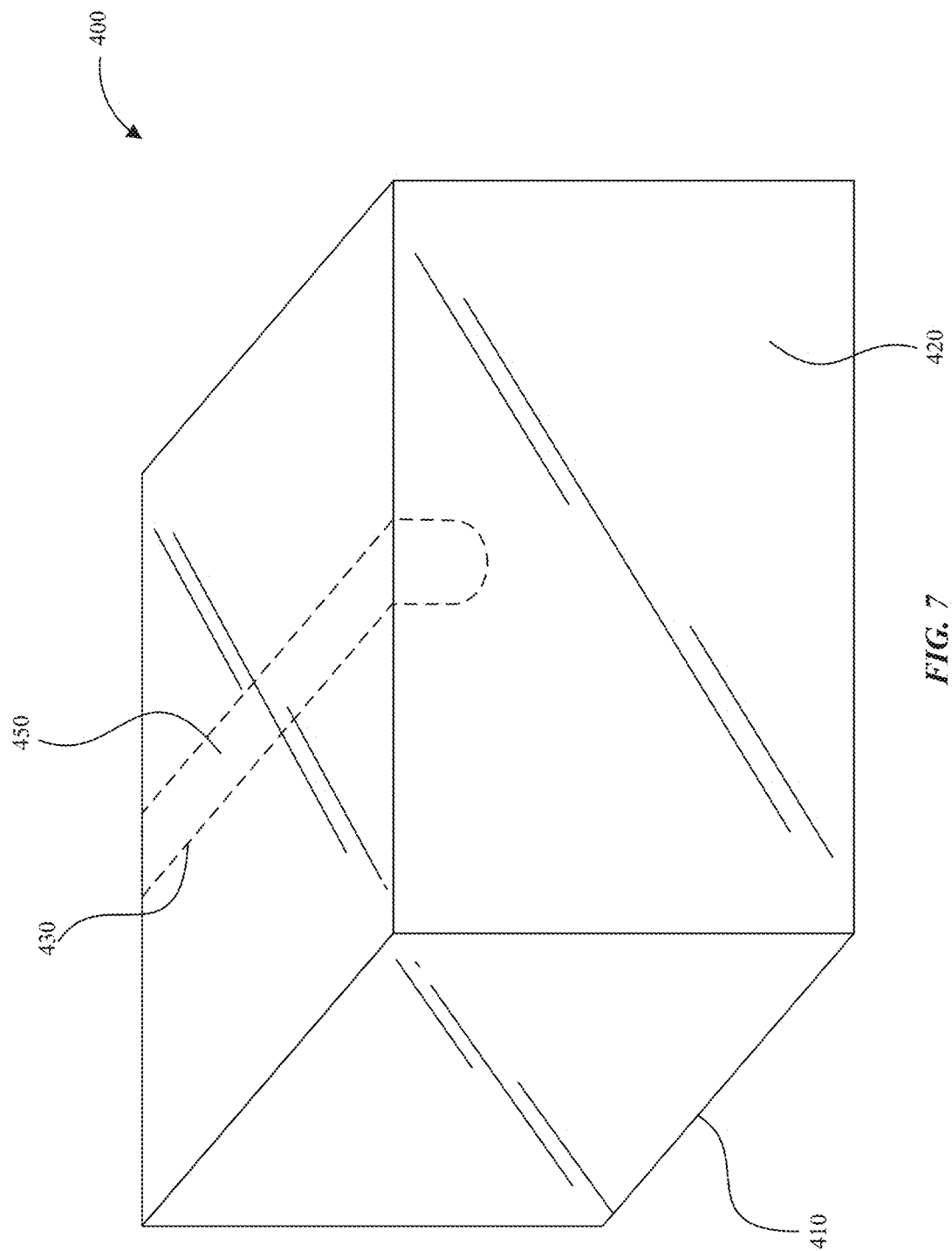
FIG. 7 shows an exemplary product package covered by a shrink-wrap film that has been laser cut to form perforations.

In another example, laser 200 is used to cut POF shrink-wrap film 120 so as to form perforations. FIG. 7 illustrates product package 400. Box 410 may be covered by shrink-wrap film 420. Laser 200 may be used to laser cut shrink-wrap film 420 along line 430 to produce perforations. The perforations may be on one side of product package 400, or on multiple sides of product package 400. In some embodiments, area 450 is surrounded by perforations along line 430.

Figure 8A:
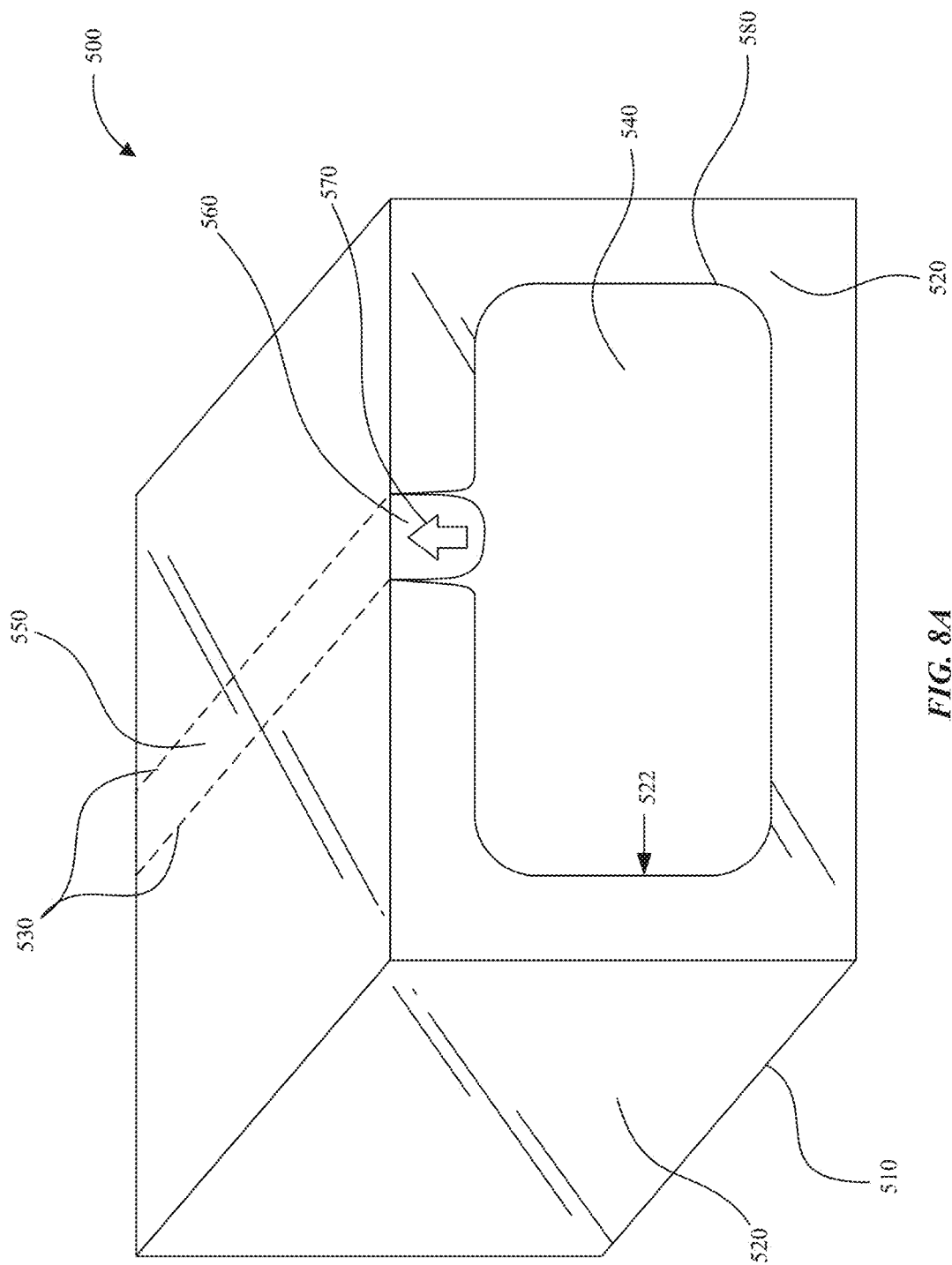
FIG. 8A shows an exemplary product package covered by a shrink-wrap film that has been laser cut to form an opening and perforations.

In another example, the laser is used to form a pull tab. For example, the laser is used to create indicia in POF shrink-wrap film by creating shaped openings or localized heating of the shrink-wrap surface. FIG. 8A illustrates product package 500 including box 510, which is partially covered by POF shrink-wrap film 520. Laser 200 may be used to cut POF shrink-wrap film 520 along line 580. In some embodiments, surface 540 of box 510 is exposed following laser cutting along line 580. Surface 540 may be exposed on one surface of product package 500, or on multiple surfaces of product package 500. Laser 200 may be used to perforate POF shrink-wrap film 520 along perforations 530. In some embodiments, POF shrink-wrap film 520 is cut along line 580 so as to form pull tab 560.

During the cutting operation, edge 522 of POF shrink-wrap film 520 may be cut to correspond to a predetermined position. In addition to cutting edge 522 along line 580, other features, such as pull tab 560 and arrow 570, can be cut into POF shrink-wrap film 520. Pull tab 560 is a protruding portion that assists removal of shrink-wrap film 520 from box 510. Pull tab 560 can be aligned with perforations 530 so that pulling up on pull tab 560 causes tearing of shrink-wrap film 520 at perforations 530 to remove POF shrink-wrap film 520 from box 510. Arrow 570 corresponds to an opening within pull tab 560 that indicates the direction for pulling.

Figure 8B:
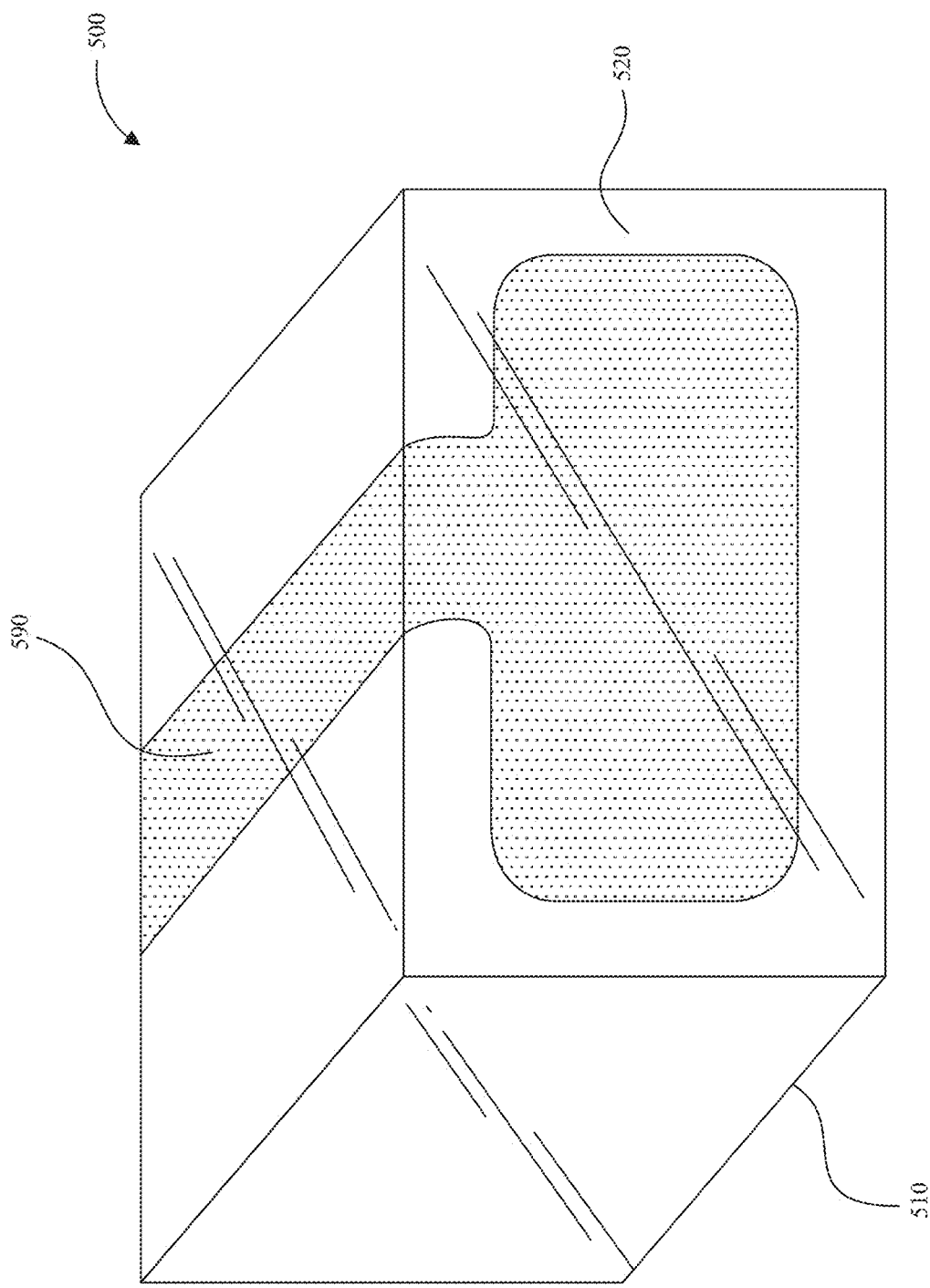
FIG. 8B shows an exemplary product package with a protective layer covered by a shrink-wrap film

In some embodiments, one or more protective layers may be used to cover part or all of the box during the laser-cutting procedure. As an example, FIG. 8B illustrates box 510 of FIG. 8A with protective layer 590 between shrink-wrap film 520 and box 510. One or more protective layers 590 may be applied to shrink-wrap film 520 and/or box 510 in order to protect box 510 from laser 200. FIG. 8B illustrates shrink-wrapped box 510 with protective layer 590 positioned on the underside of shrink-wrap film 520, between shrink-wrap film 520 and box 510. Protective layer 590 can be made of any suitable material, such as a suitable plastic film or sheet. In some embodiments, protective layer 590 is made of polyethylene terephthalate.

Protective layer 590 may enable cutting of POF shrink-wrap film 510 even without a light-absorption additive being included in POF shrink-wrap film 510. Although laser light will not be sufficiently absorbed directly by POF shrink-wrap film 510 to cut it, protective layer 510 will absorb the laser light that passes through POF shrink-wrap film 510 and it will heat up enough so that—through its contact with overlying POF shrink-wrap film 510—enough heat energy is applied to POF shrink-wrap film 510 at the application site of laser 200 to cut through POF shrink-wrap film 510. Also, through its interposition between POF shrink-wrap film 510 and box 510, protective layer 590 will also prevent damage to box 510 by laser 200.

After the protective layer is applied to box 510 or POF shrink-wrap film 520, the POF film may be laser cut without visibly affecting the box. For, example, in some embodiments, a laser having a wavelength in the range of 9000 nm to 10,000 nm is used to cut the POF film. In some embodiments, the laser cutting step includes applying a 9300 nm laser. In some embodiments, protective layer 590 is removed from shrink-wrapped box 510 after the laser cutting process.

In some embodiments, protective layer 590 is applied to POF shrink-wrap film 520 with an adhesive that binds to a removable portion of shrink-wrap film 520. When protective layer 590 is removed, the removable portion of POF shrink-wrap film 520 is simultaneously removed. In some embodiments, the removable portion of POF shrink-wrap film 520 corresponds to an indicia-shaped opening, e.g., arrow 570. That is, when protective layer 590 is removed, the internal shrink-wrap material portion corresponding to arrow 570 is removed from pull tab 560, leaving an opening at arrow 570. In this way, protective layer 590 can serve two purposes: protecting box 510 during the laser cutting process and assisting removal of a removable portion of shrink-wrap film 520. After the cutting process is complete, shrink-wrapped box 510 can be further processed or packaged.

Laser 200 can be programed to cut POF shrink-wrap film 520 at one or more locations corresponding to a position of protective layer 590. After the laser cutting, the shrink-wrapped product package 500 can be inspected for defects. In some embodiments, the shrink-wrapped product package 500 is visually inspected at a predetermined distance at all angles. The resultant shrink-wrapped box will be cosmetically appealing and provide an enhanced consumer experience.

All or a portion of each of boxes 110, 410, and 510 may be formed of cellulose-based materials (e.g., material formed of dried cellulose pulp), such as, for example, paperboard. Each of boxes 110, 410, and 510 may be formed of folded paperboard. It is to be understood that boxes 110, 410, and 510 serve as examples of types of product packages. The examples shown in FIGS. 4 to 8B can be used on boxes or other consumer packaging of various shapes and sizes, aside from the shapes and sizes shown in FIGS. 4 to 8B.

As used herein, the term "about" encompasses the values indicated plus or minus 5%.

As used herein, the term "laser cutting" may include cutting, trimming, perforating, thinning, or otherwise modifying a shrink-wrap film using a laser.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed.

It will be apparent to one of ordinary skill in the art that many modifications and variations are possible in view of the above teachings.

What is claimed is:

1. A product with packaging, comprising:
   a product packaged in a box made from cellulose-based materials; and
   a shrink-wrap film around the box, the shrink wrap film comprising:
   polyolefin; and
   a light-absorption additive, wherein the light-absorption additive does not visibly impair clarity of the shrink-wrap film,
   wherein the light-absorption additive causes the shrink-wrap film to absorb laser light to an extent sufficient to cut the shrink-wrap film without visibly affecting the box, and
   wherein the shrink-wrap film has laser-cut edges.

2. The product with packaging of claim 1, wherein the laser light is in a wavelength range of 900 nm to 1200 nm.

3. The product with packaging of claim 1, wherein the light-absorption additive is a coating applied to the polyolefin.

4. The product with packaging of claim 3, wherein the light-absorption additive coats only a portion of the polyolefin.

5. The product with packaging of claim 1, wherein the light-absorption additive is mixed into the polyolefin.

6. The product with packaging of claim 1, wherein the laser-cut edges form perforations.

7. The product with packaging of claim 1, wherein the laser-cut edges form an opening.

8. A product with packaging, comprising:
   a shrink-wrap film, the shrink-wrap film comprising:
   polyolefin; and
   a light-absorption additive,
   wherein the shrink-wrap film is completely clear, and
   wherein the shrink-wrap film can absorb laser light of a 1064 nm solid-state laser, a 9300 nm $CO_2$ laser, or a 10,640 nm $CO_2$ laser to an extent sufficient to cut the shrink wrap.

9. The product with packaging of claim 8, wherein the light-absorption additive increases the light-absorption percentage of the shrink-wrap film by at least 200% with respect to laser light of a 1064 nm solid-state laser, a 9300 nm $CO_2$ laser, or a 10,640 nm $CO_2$ laser.

10. The product with packaging of claim 8, wherein the shrink-wrap film can absorb at least 0.75% of laser light from a 1064 nm solid-state laser, a 9300 nm $CO_2$ laser, or a 10,640 nm $CO_2$ laser.

11. The product with packaging of claim 8, wherein the light-absorption additive is applied to the polyolefin as a coating.

12. The product with packaging of claim 11, wherein the light-absorption additive coats only a portion of the polyolefin.

13. The product with packaging of claim 12, wherein the portion of the polyolefin coated by the light-absorption additive corresponds to an intended position of a laser-cut edge of the shrink-wrap film.

14. The product with packaging of claim 8, wherein the light-absorption additive coats the entire polyolefin film.

15. The product with packaging claim 8, wherein the additive is mixed into the polyolefin film.

16. A product with packaging, comprising:
   a product packaged in a packaging container; and a completely clear polyolefin shrink-wrap film comprising polyolefin without a light-absorption additive, wherein the shrink-wrap film has laser-cut edges, and wherein the packaging container has no visible indications of laser damage corresponding to the laser-cut edges.

17. The product with packaging of claim 16, wherein the laser-cut edges were formed against a protective layer interposed between the polyolefin shrink-wrap film and the packaging container.

18. The product with packaging of claim 17, wherein the protective layer is a polyethylene terephthalate film.

\* \* \* \* \*